UNITED STATES PATENT OFFICE.

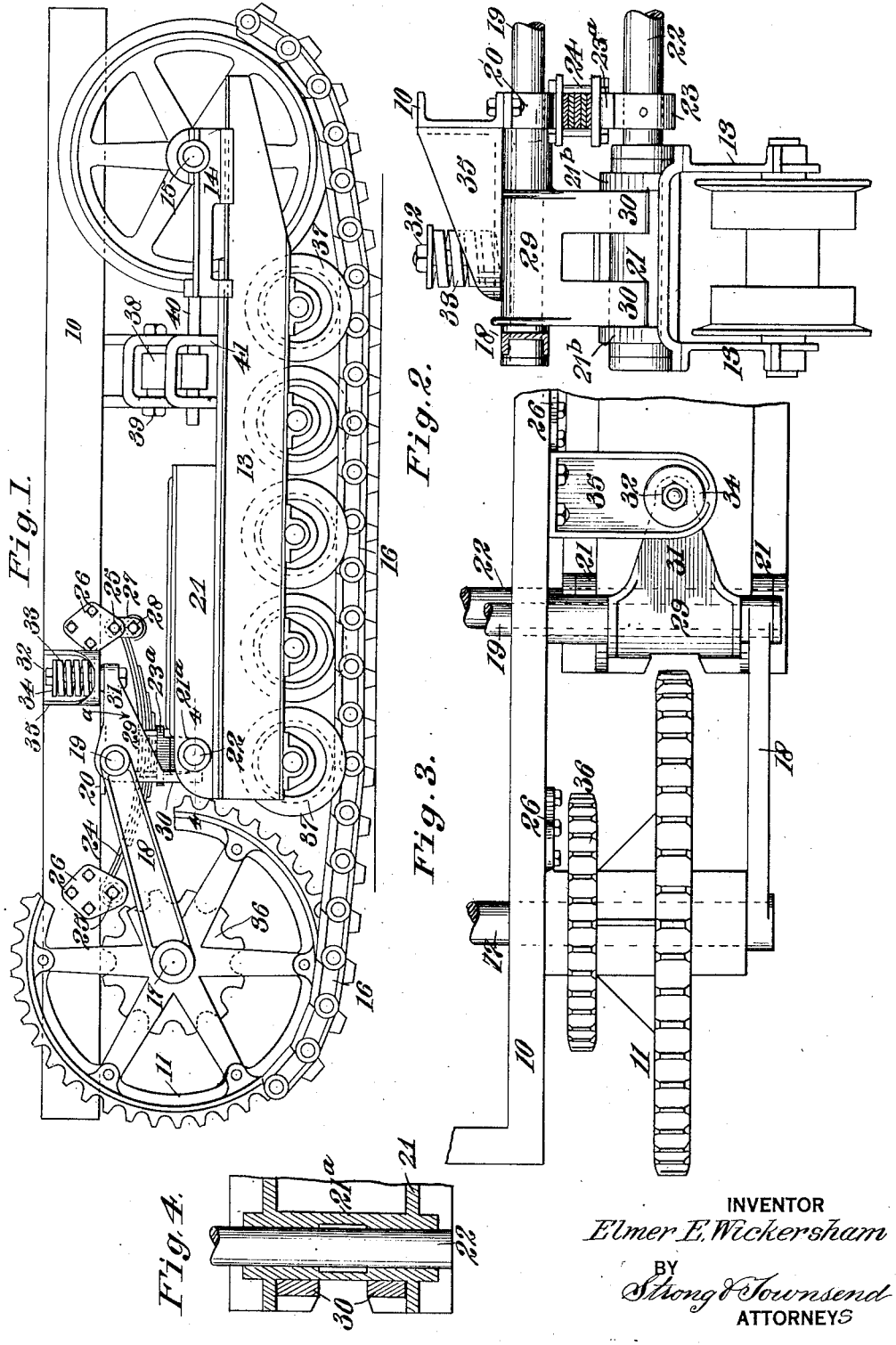

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

YIELDABLE FRAME SUSPENSION.

1,365,430.  Specification of Letters Patent.  Patented Jan. 11, 1921.

Application filed January 29, 1919. Serial No. 273,740.

*To all whom it may concern:*

Be it known that I, ELMER E. WICKERSHAM, a citizen of the United States, residing at Stockton, in the county of San Joaquin and State of California, have invented new and useful Improvements in Yieldable Frame Suspensions, of which the following is a specification.

This invention relates to a tractor of the self-laying track type and particularly pertains to a yieldable frame suspension therefor.

It has been common practice to support the main frame of tractors upon their side trucks by means of helical springs. Due to the conditions under which tractors are compelled to work, these springs are rapidly packed with an accumulation of dirt and mud which deprives them of their resilient qualities and often causes them to break under sudden shock.

It is an object of the present invention to provide a desirable frame suspension which will allow a proper yieldable movement to take place between the trucks and the frame of the vehicle without using means liable to become inoperative or readily broken. Other objects will appear hereinafter.

The present invention is concerned with a main frame supported by truck units carrying self-laying tracks and including truck frames which are connected to the main frame at their forward ends by an equalizer bar and at their rear ends by platform springs and compensating means adapted to allow a desirable flexibility of movement of the trucks in relation to the main frame.

The invention is illustrated by way of example in the accompanying drawings, in which—

Figure 1 is a view in side elevation, illustrating one form of a tractor truck equipped with the frame suspension means with which the present invention is concerned.

Fig. 2 is a view in end elevation, disclosing one of the trucks and its connection to the main frame of the vehicle.

Fig. 3 is a fragmentary view in plan, further illustrating the connection of the truck with the vehicle frame.

Fig. 4 is a view in horizontal section as seen on the line 4—4 of Fig. 1.

In the drawings, 10 indicates a main frame which may be of any desirable construction and is here shown as supported along its opposite sides by self-laying track units. These units consist of track driving sprockets 11, disposed in alinement with track idler wheels 12, between which is positioned a truck frame 13. The truck frame extends forwardly from a point directly in front of the driving sprocket and carries a slidable bearing 14, within which axle 15 of the idler wheels is mounted. This structure is embraced by an articulate track 16. The driving sprockets are carried upon axles 17 which are fixed in relation to the main frame and are further reinforced by means of forwardly and obliquely extending thrust rods 18. These rods are mounted upon the opposite ends of a compensating shaft 19 which is carried in bearings 20 fixed to the side rails of the main frame.

Suitable brackets or fittings 21 are mounted upon the rear ends of the truck sections and are provided with laterally extending bearings 21ª through which a stabilizer shaft 22 extends. This shaft is parallel in relation to the compensating shaft and is disposed therebeneath. Pinned to the shaft, adjacent the inner faces of the trucks, are spring seats 23 to slidably receive bolting pads 23ª upon each of which a suitable semi-elliptical spring 24 is secured. The semi-elliptical springs 24 extend parallel to the side rails of the main frame and are formed with eyes at their rear end, adapted to be engaged by spring bolts 25 carried by spring hangers 26. These hangers are suitably secured to the main frame. Similar hangers 26 are also bolted to the main frame forward of the compensating shaft and their spring bolts 25 fitted with depending shackles 27, the lower ends of which are provided with a bolt 28 passing through the forward eye of the spring.

A compensating mechanism is provided in connection with the suspension, which is somewhat similar to that shown in my copending application entitled "Truck compensating mechanism," filed concurrently herewith and bearing Serial No. 275,345. In the present instance compensating members 29 are provided and are freely pivoted upon a compensating shaft 19. These members are formed with a vertically extending leg 30 and a horizontally extending leg 31. The vertical leg is forked and thus forms two arms which extend in the rear of, and bear against, the back of the member 21 between flanges 21ᵇ formed on the latter. The horizontal leg is formed with an eye through which a vertical bolt 32 extends. This bolt passes upwardly through a helical spring 33 and is there fitted with a washer 34. The spring is mounted upon a spring hanger 35 extending outwardly from the side of the main frame, as clearly shown in Fig. 3, and due to the manner in which the spring is mounted, a downward motion of the leg 31 will cause compression of the spring. This spring normally acts by its expansion to hold the vertical legs 30 against the fittings 21 and thus maintains the two trucks in proper balance.

The forward ends of the trucks are connected to the main frame by an equalizer bar 38, which is centrally pivoted to the main frame upon a bolt 39, the outer ends of said bar being pivoted to the truck frame by shafts 40 passing through hangers 41.

In operation it may be assumed that the driving sprockets 11 are rotated by the action of the final drive sprockets 36 and the final drive chains not shown in the drawings. As the tractor passes over the ground, it will be acted upon by irregularities in the roadway to move the separate trucks out of horizontal alinement. This motion will, of course, be imparted to the trucks through the load supporting rollers 37, with which the trucks are fitted. In the event that the load is uniformly distributed upon the frame, one of the trucks may move upwardly and parallel to the horizontal by the deflection of the semi-elliptical spring with which it is provided and the upwardly swinging of the end of the equalizer bar to which it is connected. This action will, of course, decrease the relative movement of the truck and the main frame, due to the equalizing action of the bar 38 and the yield of the springs 24. During this movement the bearings of the stabilizing shaft 22 will slide upwardly along the front faces of the fingers 30 without altering their position. If, however, the truck frame should move horizontally relatively to the main frame, as when starting or stopping the tractor, or in event an obstruction becomes lodged between the track and the sprocket wheels, the compensating members 29 will be affected and due to the fact that the fingers 30 bear against the rear face of the bearings 21ᵃ, they will have swung in the direction of the arrow $a$, as indicated in Fig. 1. This will cause a downward pull upon the bolts 32 and compress the springs 33. The action of these springs will at all times be to restore the trucks to their proper position.

This arrangement insures that the trucks may yield to accommodate the distortion of the track but will not, in yielding, produce a tension upon the track as the truck may collapse and allow the distance between the center of the axle 17 and axle 15 to be shortened, as required by the condition of the track. The compensating members 29 will also act to maintain the two trucks in parallel alinement and will therefore dispense with the use of bridle rods, which has in most cases been necessary.

It will thus be seen that the structure here disclosed provides simple means for allowing the trucks to yield without embodying the use of parts easily breakable and also allows the trucks to collapse under certain conditions without causing additional tension to be placed upon the track.

Having thus described my invention, what I claim and desire to secure by Letters Patent is—

1. In a vehicle the combination of a main frame, a truck, a chain track embracing the truck and supporting connections between the truck and the main frame, said connections including an equalizer mechanism interposed between the forward ends of the truck and the main frame, compensating means for normally maintaining the truck frame in a horizontal position and a semi-elliptical spring connecting the rear of the truck frame with the main frame.

2. In a vehicle structure, the combination of a main frame, a truck, a chain track embracing the truck, an equalizer mechanism connecting the forward end of the truck with the main frame, a pivot member upon which the rear end of the truck is mounted, a semi-elliptical spring connecting the pivot member with the main frame and a compensating member carried by the main frame and adapted to act to maintain the truck in a horizontal position.

3. In a vehicle, the combination of a main frame, a truck, a chain track embracing the truck, a pivot shaft upon which the rear end of the truck is mounted, a spring block secured to the pivot shaft, a semi-elliptical spring mounted upon the spring block and connected with the main frame and a bell crank fulcruming upon the main frame and adapted to yieldably maintain a truck frame in its horizontally alined position.

4. In a vehicle, the combination of a main frame, a truck, a chain track embracing the truck, a pivot shaft upon which the rear end of the truck is mounted, a spring block secured to the pivot shaft a semi-elliptical spring mounted upon the spring block and connected with the main frame a bell crank fulcrumed upon the main frame and slidably engaging said truck and a yieldable connection between the bell crank and the main frame whereby swinging movement of the truck will be resisted.

In testimony whereof I have hereunto set my hand in the presence of two subscribing witnesses.

ELMER E. WICKERSHAM.

Witnesses:
DAVID B. LYMAN,
GEORGE A. DITZ.